US008660600B2

(12) United States Patent
Khandekar et al.

(10) Patent No.: US 8,660,600 B2
(45) Date of Patent: Feb. 25, 2014

(54) OVER-THE-AIR OVERLOAD INDICATOR

(75) Inventors: Aamod D. Khandekar, San Diego, CA (US); Ravi Palanki, San Diego, CA (US); Mohammad J. Borran, San Diego, CA (US); Kapil Bhattad, San Diego, CA (US); Xiliang Luo, Northridge, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 12/722,433

(22) Filed: Mar. 11, 2010

(65) Prior Publication Data
US 2010/0234061 A1 Sep. 16, 2010

Related U.S. Application Data

(60) Provisional application No. 61/159,607, filed on Mar. 12, 2009.

(51) Int. Cl.
*H04B 7/00* (2006.01)

(52) U.S. Cl.
USPC ....... 455/522; 455/69; 455/67.11; 455/115.4; 455/220

(58) Field of Classification Search
USPC ............... 455/69, 522, 103, 63.1, 114.2, 422, 455/453, 450, 464, 10, 13.4, 509, 513, 455/67.16, 115.1, 115.4, 135, 222, 226.3, 455/442, 405, 423, 67.13, 561, 67.11, 220; 370/329, 342, 260, 311, 225, 252, 337; 725/62, 129, 117
See application file for complete search history.

(56) References Cited

U.S. PATENT DOCUMENTS 6,993,361 B2 1/2006 Chitrapu
7,363,005 B2 4/2008 Baccelli et al.
(Continued)

FOREIGN PATENT DOCUMENTS

CN 101043640 A 9/2007
CN 101180804 A 5/2008
(Continued)

OTHER PUBLICATIONS

Alcatel-Lucent: "On the Overload Indicator Interworking with ICIC" 3GPP Draft; R1-080447, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; 20080109, Jan. 9, 2008, XP050108965 p. 3-p. 4.

(Continued)

*Primary Examiner* — Tan Trinh
(74) *Attorney, Agent, or Firm* — Nerrie M. Zohn

(57) ABSTRACT

Methods, systems, apparatus and computer program products are provided to facilitate power control in wireless communication systems. A cell that is experiencing excessive interference conditions may generate an over-the-air overload indicator indicative of interference conditions at the cell. The over-the-air overload indicator is received by one or more user equipment in a neighboring cell. In response, the user equipment determines adjustments to its transmit power that reduce and/or eliminate the interference. This determination may be carried out by the user equipment, by the serving base station, or through cooperation between the user equipment and the serving base station. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

40 Claims, 13 Drawing Sheets

(56) References Cited

U.S. PATENT DOCUMENTS

| | | | |
|---|---|---|---|
| 7,587,206 B2 | 9/2009 | Bi et al. | |
| 8,068,513 B2 | 11/2011 | Frederiksen et al. | |
| 2002/0061764 A1* | 5/2002 | Kim et al. | 455/522 |
| 2004/0235510 A1* | 11/2004 | Elicegui et al. | 455/522 |
| 2004/0252658 A1 | 12/2004 | Hosein et al. | |
| 2005/0136960 A1* | 6/2005 | Timus et al. | 455/522 |
| 2005/0250497 A1 | 11/2005 | Ghosh et al. | |
| 2005/0254555 A1 | 11/2005 | Teague et al. | |
| 2005/0277425 A1 | 12/2005 | Niemela et al. | |
| 2006/0019694 A1* | 1/2006 | Sutivong et al. | 455/522 |
| 2007/0033618 A1* | 2/2007 | Kiukkonen et al. | 725/62 |
| 2007/0082619 A1* | 4/2007 | Zhang et al. | 455/69 |
| 2007/0297360 A1* | 12/2007 | Joachim et al. | 370/329 |
| 2008/0008152 A1* | 1/2008 | Lohr et al. | 370/342 |
| 2008/0043879 A1 | 2/2008 | Gorokhov et al. | |
| 2008/0075030 A1* | 3/2008 | Timus et al. | 370/311 |
| 2008/0081655 A1 | 4/2008 | Shin et al. | |
| 2008/0165675 A1 | 7/2008 | Yang et al. | |
| 2008/0214121 A1* | 9/2008 | Sutivong et al. | 455/67.13 |
| 2008/0232326 A1 | 9/2008 | Lindoff et al. | |
| 2008/0253300 A1* | 10/2008 | Wakabayashi et al. | 370/252 |
| 2008/0254804 A1* | 10/2008 | Lohr et al. | 455/442 |
| 2008/0304584 A1* | 12/2008 | Nishio et al. | 375/260 |
| 2009/0097444 A1* | 4/2009 | Lohr et al. | 370/329 |
| 2009/0109939 A1* | 4/2009 | Bhushan et al. | 370/337 |
| 2009/0111503 A1* | 4/2009 | Pedersen et al. | 455/522 |
| 2009/0156225 A1 | 6/2009 | Angelow et al. | |
| 2009/0163238 A1* | 6/2009 | Rao et al. | 455/522 |
| 2009/0179755 A1* | 7/2009 | Bachl et al. | 340/540 |
| 2009/0219876 A1* | 9/2009 | Kimura et al. | 370/329 |
| 2009/0258651 A1* | 10/2009 | Sagfors et al. | 455/442 |
| 2010/0008317 A1 | 1/2010 | Bhattad et al. | |
| 2010/0056061 A1 | 3/2010 | Luo et al. | |
| 2010/0099449 A1* | 4/2010 | Borran et al. | 455/501 |
| 2010/0159950 A1 | 6/2010 | Toh et al. | |
| 2010/0182903 A1* | 7/2010 | Palanki et al. | 370/225 |
| 2010/0203882 A1* | 8/2010 | Frenger et al. | 455/423 |
| 2010/0253400 A1* | 10/2010 | Lai et al. | 327/156 |
| 2011/0021239 A1* | 1/2011 | Wakabayashi et al. | 455/522 |
| 2013/0242744 A1* | 9/2013 | Wigren et al. | 370/236 |

FOREIGN PATENT DOCUMENTS

| | | |
|---|---|---|
| EP | 1276340 A1 | 1/2003 |
| EP | 1901442 A2 | 3/2008 |
| EP | 1976168 A1 | 10/2008 |
| WO | WO-9113582 A1 | 9/1991 |
| WO | 2008038979 A2 | 4/2008 |
| WO | 2008103981 A2 | 8/2008 |

OTHER PUBLICATIONS

International Search Report and Written Opinion—PCT/US2010/027239—International Search Authority, European Patent Office, Jun. 28, 2010.

Lucent Technologies: "Uplink Scheduling With Inter—cell Interference Control" 36PP Draft; R2-062814, SRD Generation Partnership Project (3GPP), Mobile Competence Centre ; 650, Route Des Lucioles ; F-06921 Sophia-Antipolis Cedex ; France, vol. . RAN WG2, No. Seoul, Korea; 20061005, Oct. 5, 2006, XP050132339.

3GPP TS 36.300 v8.7.0, TSG RAN Evolved Universal Terrestrial Radio Access (E-UTRA) and Evolved Universal Terrestrial Radio Access Network (E-UTRAN), Overall Description, Stage 2 Release Dec. 8, 2008, pp. 19-20.

3GPP TSG RAN WG1 #51bis R1-080564 "LS on Ran1 ICIC status" RAN WG1, Release 8, Seville, Spain, Jan. 14-18, 2008, pp. 1-2.

Telecom Italia "Way forward on UL ICIC/Overload Indicator for LTE" 3GPP TSG RAN WG1 #51 R1-075050, Jeju, Korea, Nov. 5-9, 2007, pp. 1-2.

3GPP2: "Physical Layer for Ultra Mobile Broadband (UMB) Air Interface Specification, 3GPP2 C.S0084-001-0 v2.0", Aug. 2007, pp. 4-1-4-58.

ETRI: "Open-Loop Transmit Diversity Scheme for P-BCH Using S-SCH" 3GPP RAN WG1 Meeting #48, R1-070747, Feb. 6, 2007.

ETRI: "Performance Comparison of Transmit Diversity Schemes for P-BCH" 3GPP RAN WG1 Meeting #49, R1-072126, May 2, 2007.

Jette, et al., "UMBFDD Draft Technology Overview, IEEE C802.20-07/09", IEEE 802.20 Working Group on Mobile Broadband Wireless Access, Mar. 5, 2007, pp. 1-34.

Sarkar, et al., "MIMO in Wireless Wan- The UMB System," Communication Systems Software and Middleware and Workshops, 2008, Jan. 6, 2008, pp. 57-64, ISBN: 978-1-4244-1796-4.

Taiwan Search Report—TW099113340—TIPO —Mar. 16, 2013.

Wang, et al., "Interference Management and Handoff Techniques in Ultra Mobile Broadband Communication Systems" IEEE International Symposium Onspread Spectrum Techniques and Applications, Aug. 25, 2008, pp. 166-172, XP031319003.

Wang, et al., "Preamble Design and System Acquisition in Ultra Mobile Broadbane Communication Systems," Vehicular Technology Conference 2008, Sep. 21, 2008, pp. 1-8, ISBN: 987-1-4244-1796-4.

3rd Generation Partnership Project 2, 3GPP2: "Physical Layer for Ultra Mobile Broadband (UMB) Air Interface Specification", 3GPP2 C.S0084-001-0 v2.0, Aug. 2007, 3GPP2, XP002581093, vol. 2.0, pp. 4-1-4-58.

Lucent Technologies, 'Uplink Scheduling With Inter-Cell Power Control, with Extensions to Interference Coordination', 3GPP TSG-RAN WG1 #47, R1-063478, (Nov. 6-10, 2006) pp. 1-7.

Motorola: "Uplink Inter-Cell Power Control: X2 Messages", 3GPP TSG RAN1 #50-bis, R1-074042, Oct. 8-12, 2007, p. 1.

Nicopolitidis P., "Third Generation and Beyond Wireless Systems", Communications of the ACM Communications of the ACM, vol. 46, No. 8, Aug. 2003, pp. 120-124, Retrieved from the Internet: URL:http://users.auth.gr/~petros/papers/cacm-3G.pdf [retrieved on Oct. 8, 2013].

Xiang Yikang., et al., "Inter-cell Interference Mitigation through FlexibleResource Reuse in OFDMA based Communication-Networks", European Wireless Conference, 2007 , Apr. 4, 2007 pp. 1-7, Paris, France, Retreived from the Internet URL:http://confs.comelec.telecom-paristech.fr/EW2007/papers/1569014820.pdf [retrieved on Oct. 8, 2013].

* cited by examiner

OVER-THE-AIR OVERLOAD INDICATOR

The present application claims priority to U.S. Provisional Patent Application Ser. No. 61/159,607, entitled "Over the Air Overload Indicator", filed Mar. 12, 2009, the entirety of which is hereby incorporated by reference.

FIELD

The present disclosure relates generally to the field of wireless communications. More particularly, the present disclosure relates to facilitating power management and control in wireless communication networks.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

The performance of a wireless communication system is sometimes limited by interference between the various transmissions that occur within the wireless network. For example, the LTE system performance may be limited by inter-cell interference, especially near the cell edge regions where the transmissions to/from the devices in neighboring cells may interfere with the operations of devices in the current cell. In order to reduce and/or control inter-cell interference, an LTE system may employ uplink power control mechanisms, such as inter-cell interference coordination (ICIC), to improve the signal-to-interference in the uplink channel. An overload indicator is one mechanism that is used to facilitate uplink inter-cell coordination. The overload indicators are exchanged among the base stations (or eNodeBs) of a network and provide information on the uplink interference level experienced in one or more parts of the cell bandwidth. A cell receiving the overload indicator may reduce the interference generated on some of the resource blocks by, for example, adjusting the transmission scheduling strategy and, thereby, improving the interference experienced by the cell(s) that issued the overload indicator(s).

Release 8 of the LTE standard specifications contain provisions for sending the overload indicator to a neighboring eNodeB over the backhaul X2 interface. The overload indicator consists of one value per resource block (RB) on the uplink. The overload indicator may further be quantized to three levels that are indicative of the level of interference experienced by a neighbor eNodeB on a particular resource block. The overload indicator, according to the Release 8 of the LTE standard specifications, must be sent at most once every 20 ms.

The above-described utilization of the overload indicator requires an X2 connection between all neighboring eNodeBs. However, such a connection may not be available and/or feasible in many instances. In particular, an X2 connection between eNodeBs may not exist in initial deployments of the LTE systems. Further, even if an X2 connection is available, the latency associated with receiving an overload indicator from a neighboring cell and making subsequent scheduling and/or power adjustments may be too high. It is also likely that certain eNodeB's, such as Home eNodeBs (or HeNBs), will not have X2 connections with their neighboring cells. In fact, in a dense HeNB deployment, it may be quite challenging to support X2 connections between a macro eNodeB and all the HeNBs within its coverage. In addition, HeNB deployments can give rise to particularly severe interference conditions since a user equipment cannot always connect to its optimal serving cell.

Another drawback associated with the current overload indication mechanism is that an eNodeB's response to the overload indicator is not standardized. As such, interference control among neighboring eNodeBs that are associated with different vendors may not be possible, or may be ineffective. Such a situation is likely to happen in HeNBs, where having neighboring eNodeBs from different vendors is quite likely.

Further, the backhaul-based overload indicator signaling requires an eNodeB to be aware of the interference environment in order to implement an appropriate response to the received overload indicators. In particular, the eNodeB receiving the overload indicator has to be aware of the particular UE (if any) that is contributing to the excessive interference seen at the neighbor eNodeB. Such an awareness may not be sufficiently established in cases where the wireless channel environment undergoes substantial changes between successive measurement reports that are received by the eNodeB.

SUMMARY

The disclosed embodiments relate to systems, methods, apparatus and computer program products that facilitate uplink power control in wireless communication systems. To this end, according to the various embodiments, a cell that is experiencing excessive interference conditions may provide an over-the-air overload indicator directly to one or more user equipment within one or more neighboring cells, in response to which, the one more user equipment may adjust their transmit powers.

One aspect of the disclosed embodiments relates to a method for determining adjustments to transmit power of a user equipment in response to a received over-the-air overload indicator. According to this method, the over-the-air overload indicator comprises information indicative of interference conditions at one or more cells. The method further comprises effecting transmit power control in accordance with the adjustments. In one example, the adjustments to the transmit power further comprise at least one of a power level adjustment, a transmit schedule adjustment, or a transmit frequency adjustment.

According to one embodiment, the method further comprises reporting the adjustments to a serving base station of the user equipment. In one embodiment, the adjustments are determined in accordance with a probability function, while in a different embodiment, the over-the-air overload indicator is received as part of one or more resource blocks within a third generation partnership project (3GPP) long term evolution (LTE) subframe. In yet another embodiment, the transmit power control is effected in accordance with the adjustments that provide transmit power shaping. According to another embodiment, the adjustments are determined in accordance with at least one of a differential path loss and a signal to noise ratio. For example, the adjustments can be determined as a probability value that in accordance with a maximum signal to noise ratio, a minimum signal to noise ratio, a signal to noise ratio obtained at a serving base station and a differential path-loss.

In another embodiment, more than one over-the-air overload indicators are received, and the adjustments are determined by determining separate adjustments to transmit power in response to each over-the-air overload indicator, and determining the adjustments in accordance with the separate adjustments. In one example, the adjustments correspond to the separate adjustment with the largest value. In another embodiment, more than one over-the-air overload indicators are received from a plurality of cells, and the adjustments are determined by assessing a subset of the received over-the-air overload indicators. In one example, more than one over-the-air overload indicators are received from a plurality of cells, and the adjustments are determined by assessing a fraction of the received over-the-air overload indicators. In one variation, the magnitude of the adjustments is modified by a factor that is inversely proportional to the fraction. For example, when one-half of the received over-the-air overload indicators are assessed, the adjustments to transmit power can be twice as large as a case where all received over-the-air overload indicators are assessed.

According to another embodiment, no further over-the-air overload indicators are received within a specified period and, in such a case, the adjustments correspond to an increase in transmit power level of the user equipment. For example, the transmit power level of the user equipment is increased if the transmit power level does not exceed a predetermined threshold. In yet another embodiment, the method further comprises reporting the adjustments to a serving base station prior to the effecting the transmit power. In such a scenario, the method also comprises receiving the adjustments, where the received adjustments are modified adjustments.

In one embodiment, the over-the-air overload indicator comprises information related to multiple carriers within a third generation partnership project long term evolution network. In one example, the overload indicator is received on a single downlink carrier, and information related to each of the multiple carriers is carried in a separate resource block within the downlink carrier. In another embodiment, the over-the-air overload indicator comprises information indicative of co-channel interference conditions. In this embodiment, the over-the-air overload indicator can be used to control an adjacent carrier leakage ratio.

Another aspect of the disclosed embodiments relates to a method that comprises reporting an over-the-air overload indicator to a serving base station of a user equipment, where the over-the-air overload indicator comprises information indicative of interference conditions at one or more cells. The method further comprises receiving adjustments to transmit power of the user equipment, and effecting transmit power control in accordance with the adjustments.

In another aspect of the disclosed embodiments, a method is described that comprises generating one or more over-the-air overload indicators at a base station, where the one or more over-the-air overload indicators comprise information indicative of interference conditions at a cell served by the base station. The method further comprises transmitting the one or more overload indicators directly to one or more user equipment in one or more neighboring cells.

Another aspect of the disclosed embodiments relates to a processor, and a memory that comprises processor executable code. The processor executable code, when executed by the processor, configures the apparatus to determine adjustments to transmit power of the apparatus in response to a received over-the-air overload indicator, where the over-the-air overload indicator comprises information indicative of interference conditions at one or more cells. The processor executable code, when executed by the processor, also configures the apparatus to effect transmit power control in accordance with the adjustments.

Another aspect of the disclosed embodiments also relates to an apparatus that comprises a processor, and a memory comprising processor executable code. However, the processor executable code, when executed by the processor, configures the apparatus to report an over-the-air overload indicator to a serving base station of the apparatus, where the over-the-air overload indicator comprises information indicative of interference conditions at one or more cells. the processor executable code, when executed by the processor, also configures the apparatus to receive adjustments to transmit power of the apparatus and effect transmit power control in accordance with the adjustments.

According to a yet another aspect of the disclosed embodiments, an apparatus comprises a processor, and a memory comprising processor executable code. The processor executable code, when executed by the processor, configures the apparatus to generate one or more over-the-air overload indicators, where the one or more over-the-air overload indicators comprise information indicative of interference conditions at a cell served by the base station. The processor executable code, when executed by the processor, also configures the apparatus to transmit the one or more overload indicators directly to one or more user equipment in one or more neighboring cells.

The various disclosed embodiments may be also implemented as computer program products. In one aspect of the disclosure, a computer program product, embodied on a computer-readable medium, is provided. The computer program product comprises program code for determining adjustments to transmit power of a user equipment in response to a received over-the-air overload indicator, where the over-the-air overload indicator comprises information indicative of interference conditions at one or more cells. The computer program product further comprises program code for effecting transmit power control in accordance with the adjustments.

Another aspect of the disclosed embodiments also relates to a computer program product, embodied on a computer-readable medium. However, the computer program code comprises program code for reporting an over-the-air overload indicator to a serving base station of a user equipment, where the overload indicator comprises information indicative of interference conditions at one or more cells. The computer program code also comprises program code for receiving adjustments to transmit power of the user equipment, and program code for effecting transmit power control in accordance with the adjustments.

In another aspect of the disclosed embodiments a computer program product, embodied on a computer readable medium, is provided. The computer program product comprises program code for generating one or more over-the-air overload indicators at a base station, where the one or more over-the-air overload indicators comprise information indicative of interference conditions at a cell served by the base station. The computer program product further comprises program code for transmitting the one or more overload indicators directly to one or more user equipment in one or more neighboring cells.

According to another aspect of the provided embodiments, an apparatus comprises means for determining adjustments to transmit power of the apparatus in response to a received over-the-air overload indicator, where the over-the-air overload indicator comprises information indicative of interference conditions at one or more cells. The apparatus further comprises means for effecting transmit power control in accordance with the adjustments.

Another aspect of the provided embodiments relates to an apparatus that comprises means for reporting an over-the-air overload indicator to a serving base station of the apparatus, where the over-the-air overload indicator comprises information indicative of interference conditions at one or more cells. The apparatus further comprises means for receiving adjustments to transmit power of the user equipment, and means for effecting transmit power control in accordance with the adjustments.

Another aspect of the disclosed embodiments is associated with another apparatus that comprises means for generating one or more over-the-air overload indicators at a base station, where the one or more over-the-air overload indicators comprise information indicative of interference conditions at a cell. The apparatus further comprises means for transmitting the one or more overload indicators directly to one or more user equipment in one or more neighboring cells.

These and other advantages and features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are described by referring to the attached drawings, in which.

DETAILED DESCRIPTION OF CERTAIN EMBODIMENTS

Figure 1:
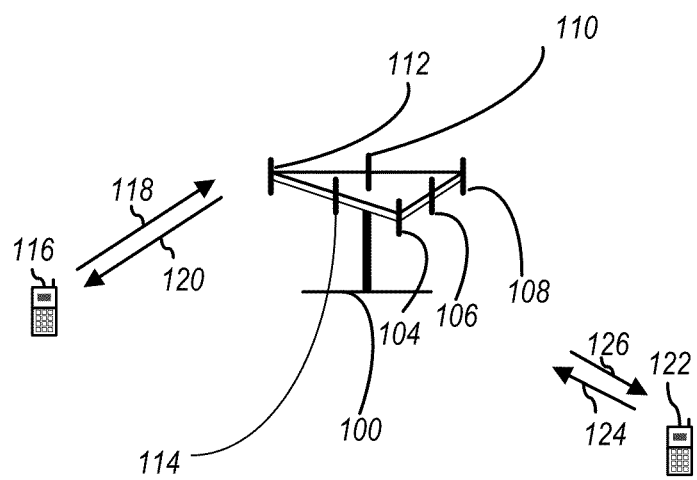
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile, wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, evolved NodeB (eNB), or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one of more antennas. For example, if the base station 100 comprises six antennas, one antenna group may comprise the first antenna 104 and the second antenna 106, another antenna group may comprise the third antenna 108 and the fourth antenna 110, while a third group may comprise the fifth antenna 112 and the sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124, 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate the various disclosed embodiments may comprise logical channels that are classified into Control Channels and Traffic Channels. Logical control channels may comprise a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate the various embodiments may additionally comprise logical transport channels that are classified into downlink (DL) and uplink (UL). The DL transport channels may comprise a broadcast channel (BCH), a downlink shared data channel (DL-SDCH), a multicast channel (MCH) and a Paging Channel (PCH). The UL transport channels may comprise a random access channel (RACH), a request channel (REQCH), an uplink shared data channel (UL-SDCH) and plurality of physical channels. The physical channels may also comprise a set of downlink and uplink channels.

In some disclosed embodiments, the downlink physical channels may comprise at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may comprise at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

| | |
|---|---|
| 3G | 3rd Generation |
| 3GPP | 3rd Generation Partnership Project |
| ACLR | Adjacent channel leakage ratio |
| ACPR | Adjacent channel power ratio |
| ACS | Adjacent channel selectivity, |
| ADS | Advanced Design System |
| AMC | Adaptive modulation and coding |
| A-MPR | Additional maximum power reduction |
| ARQ | Automatic repeat request |
| BCCH | Broadcast control channel |
| BTS | Base transceiver station |
| CDD | Cyclic delay diversity |
| CCDF | Complementary cumulative distribution function |
| CDMA | Code division multiple access |
| CFI | Control format indicator |
| Co-MIMO | Cooperative MIMO |
| CP | Cyclic prefix |
| CPICH | Common pilot channel |
| CPRI | Common public radio interface |
| CQI | Channel quality indicator |
| CRC | Cyclic redundancy check |
| DCI | Downlink control indicator |
| DFT | Discrete Fourier transform |
| DFT-SOFDM | Discrete Fourier transform spread OFDM |
| DL | Downlink (base station to subscriber transmission) |
| DL-SCH | Downlink shared channel |
| D-PHY | 500 Mbps physical layer |
| DSP | Digital signal processing |
| DT | Development toolset |
| DVSA | Digital vector signal analysis |
| EDA | Electronic design automation |
| E-DCH | Enhanced dedicated channel |
| E-UTRAN | Evolved UMTS terrestrial radio access network |
| eMBMS | Evolved multimedia broadcast multicast service |
| eNB | Evolved Node B |
| EPC | Evolved packet core |
| EPRE | Energy per resource element |
| ETSI | European Telecommunications Standards Institute |
| E-UTRA | Evolved UTRA |
| E-UTRAN | Evolved UTRAN |
| EVM | Error vector magnitude |

-continued

| | |
|---|---|
| FDD | Frequency division duplex |
| FFT | Fast Fourier transform |
| FRC | Fixed reference channel |
| FS1 | Frame structure type 1 |
| FS2 | Frame structure type 2 |
| GSM | Global system for mobile communication, |
| HARQ | Hybrid automatic repeat request, |
| HDL | Hardware description language |
| HI | HARQ indicator |
| HSDPA | High speed downlink packet access |
| HSPA | High speed packet access |
| HSUPA | High speed uplink packet access |
| IFFT | Inverse FFT |
| IOT | Interoperability test |
| IP | Internet protocol |
| LO | Local oscillator |
| LTE | Long term evolution |
| MAC | Medium access control |
| MBMS | Multimedia broadcast multicast service |
| MBSFN | Multicast/broadcast over single-frequency network |
| MCH | Multicast channel |
| MIMO | Multiple input multiple output |
| MISO | Multiple input single output |
| MME | Mobility management entity |
| MOP | Maximum output power |
| MPR | Maximum power reduction |
| MU-MIMO | Multiple user MIMO |
| NAS | Non-access stratum |
| OBSAI | Open base station architecture interface |
| OFDM | Orthogonal frequency division multiplexing |
| OFDMA | Orthogonal frequency division multiple access |
| PAPR | Peak-to-average power ratio |
| PAR | Peak-to-average ratio |
| PBCH | Physical broadcast channel |
| P-CCPCH | Primary common control physical channel |
| PCFICH | Physical control format indicator channel |
| PCH | Paging channel |
| PDCCH | Physical downlink control channel |
| PDCP | Packet data convergence protocol |
| PDSCH | Physical downlink shared channel |
| PHICH | Physical hybrid ARQ indicator channel |
| PHY | Physical layer |
| PRACH | Physical random access channel |
| PMCH | Physical multicast channel |
| PMI | Pre-coding matrix indicator |
| P-SCH | Primary synchronization signal |
| PUCCH | Physical uplink control channel |
| PUSCH | Physical uplink shared channel. |

Figure 2:
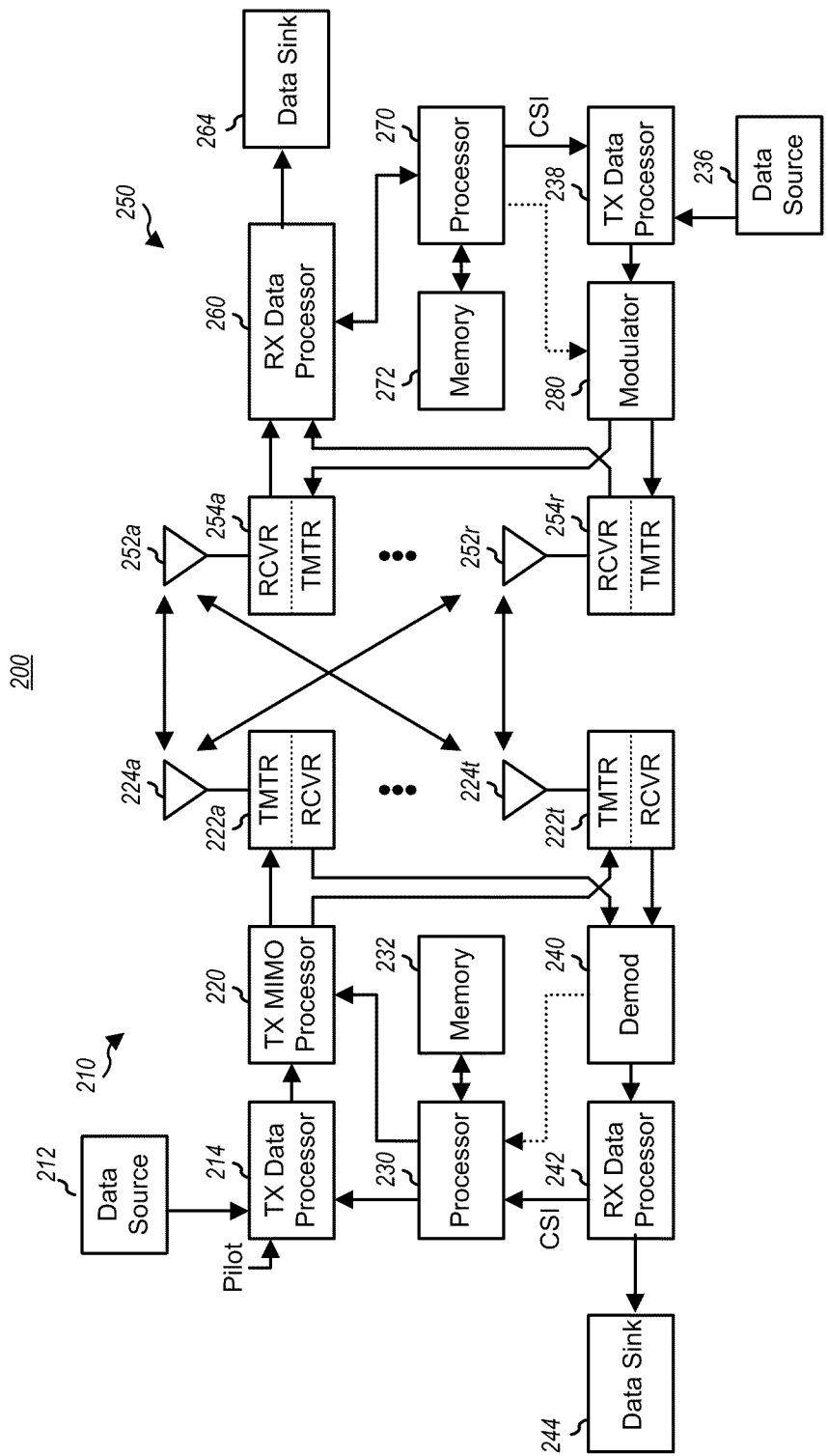
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes, and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one example, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples, and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves, and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, the channel response estimate generated by the RX data processor 260 can be used to perform space/time processing at the receiver system 250, adjust power levels, change modulation rates or schemes, and/or other appropriate actions. Additionally, the RX data processor 260 can further estimate channel characteristics such as, signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processer 270 is processed by a TX data processor 238, modulated by a modulator 280, conditioned by the receiver system transceivers 254a through 254r, and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/ or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can in some instances be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO system communication 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. There are advantages to these embodiments in terms of robustness and reliability of the communication channel. In transmit diversity systems each of the signals transmitted from the transmitter system antennas 224a through 224t will experience a different interference environment (fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
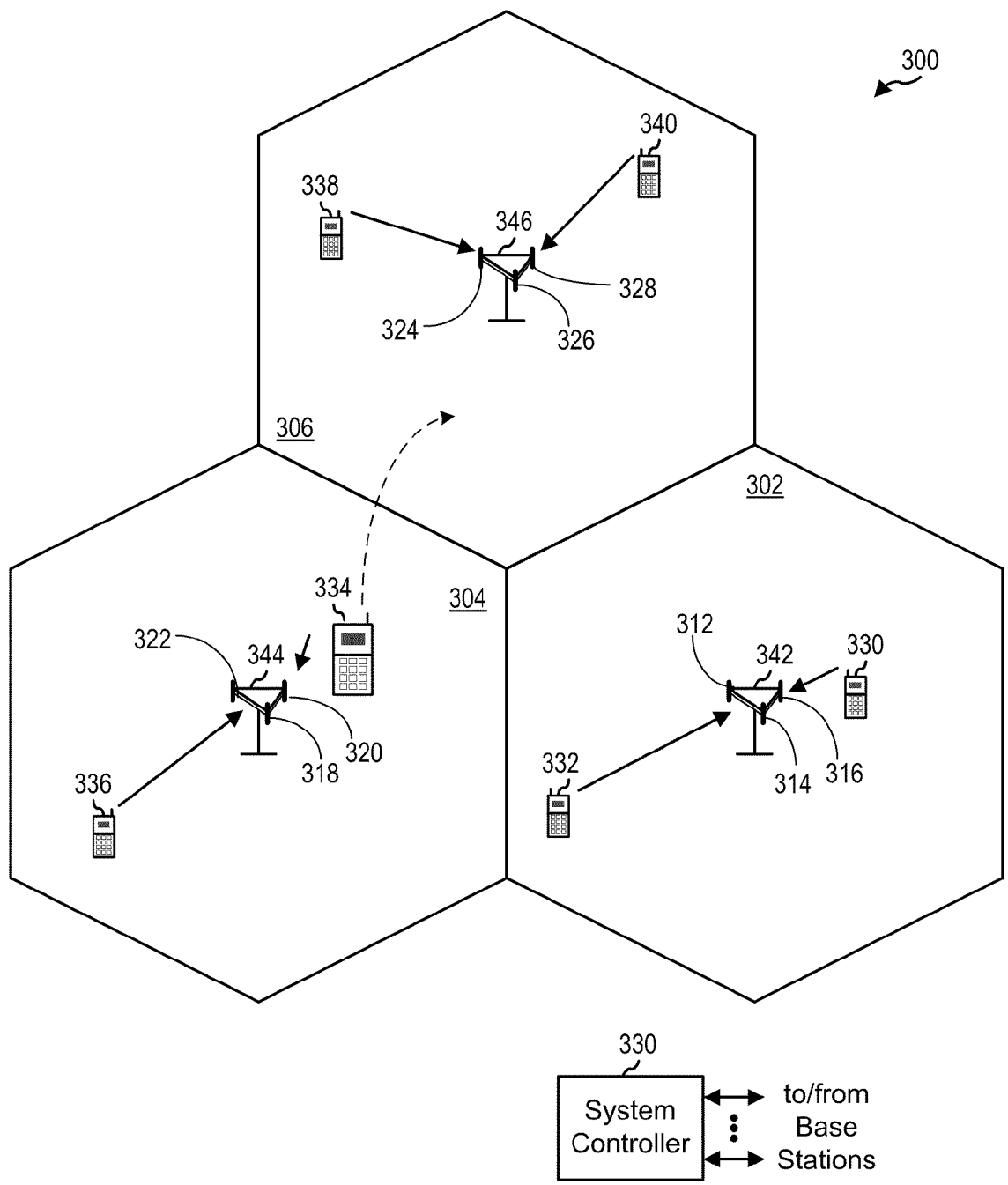
FIG. 3 illustrates a wireless network.

FIG. 3 illustrates a wireless network 300 within which the various disclosed embodiments may be implemented. The exemplary wireless communication system 300 comprises multiple cells, including cells 302, 304, and 306. The cells 302, 304 and 306 of the communication network 300 may include a base station that includes multiple sectors. The multiple sectors can be formed by groups of antennas with each antenna responsible for communication with one or more user equipment in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 of the communication network 300 can include several wireless communication devices, e.g., user equipment, which can be in communication with one or more sectors of each cell 302, 304 or 306 within the communication network 300. For example, user equipment 330 and 332 can be in communication with base station 342, user equipment 334 and 336 can be in communication with base station 344, and user equipment 338 and 340 can be in communication with base station 346. FIG. 3 also illustrates a system controller 300 that is in communication with one or more base stations of the communication network 300.

As noted earlier, in a communication network, such as the wireless communication network 300 that is depicted in FIG. 3, a base station may transmit an overload indicator to the base station of a neighboring cell, over the X2 backhaul interface, in order to provide information regarding uplink interference experienced in one or more portions of the cell's bandwidth. The response of a cell receiving the overload indicator (hereinafter "the receiving cell") is not standardized and is, therefore, at the discretion of the implementers of the base station. In a typical response scenario, however, the receiving cell may reduce the interference generated on some of the resource blocks by, for example, adjusting the scheduling strategy of the transmissions by the user equipment, reducing and/or reallocating the transmit power of user equipment or combinations thereof. The extent of power control may be based on, for example, the degree of interference caused by the user equipment. In order to assess the degree and amount of interference, the receiving cell may rely on differential path-loss measures that are typically computed from measurement reports sent by the user equipment.

The overload indicator in, for example, an LTE network enables the network to maintain the interference seen at each eNodeB at or below a desired value. The interference level is often measured relative to the thermal level at the eNodeB and is referred to as Interference over Thermal (IoT). Tight control of the IoT level has several benefits. For example, a predictable IoT level enables the network to perform accurate rate predictions in data channel such as PUSCH. This is also relevant for control channels, such as PUCCH, which cannot rely on hybrid automatic repeat request (HARQ) retransmissions. In the absence of tight IoT controls, the information that is transmitted over such channels may have to be sent at very conservative power levels, which in turn, may cause excessive interference to other eNodeBs. Note that while, in some implementations, the PUCCH is primarily susceptible to control-on-control interference, control information can often experience interference from data channels, as well, due to transmissions on PUSCH, in addition to different PUCCH region sizes in neighboring eNodeBs.

High interference levels observed at an eNodeB can further impact the link budget of the user equipment that are served by that eNodeB. The link budget impact can cause data outages, for example, due to loss of voice over IP (VoIP) packets, as well as control outages that can include loss of channel quality information (CQI) reports and ACK/NACK information.

The overload indicator at a receiving cell may further be used to realize power-shaping gains using power control algorithms that utilize differential path loss information of a user equipment. In particular, in such a scheme, the user equipment that are located close to the cell edge can transmit at relatively low power spectral densities (since they are the dominant interferers) while the user equipment that are not located close to the cell edge can transmit at higher power spectral densities (since they cause relatively lower interference). This type of power shaping can help increase network capacity. It should be noted that the term "power spectral density" may refer to a power value that is normalized by the bandwidth (e.g., a constant times power per resource block). For example, the transmitted power of a user equipment may be proportional to the number of number of resource blocks allocated to that user equipment multiplied by the power per resource block. As such, controlling a user equipment's transmit power may be effected by controlling power spectral density, which controls the transmitted power per resource block can be accomplished by.

However, as also noted earlier, the transmission of an overload indicator over an X2 interface, and subsequent actions by the receiving cell to effect power control, may not be feasible for various reasons. For example, an X2 connectivity among the various base stations may not be available. Further, even if an X2 interface is available, the latency associated with such communications may be too high. In addition, the power control/adjustments undertaken by an base station may not properly alleviate channel interference conditions, if such conditions are varying between successive measurement reports.

Figure 4:
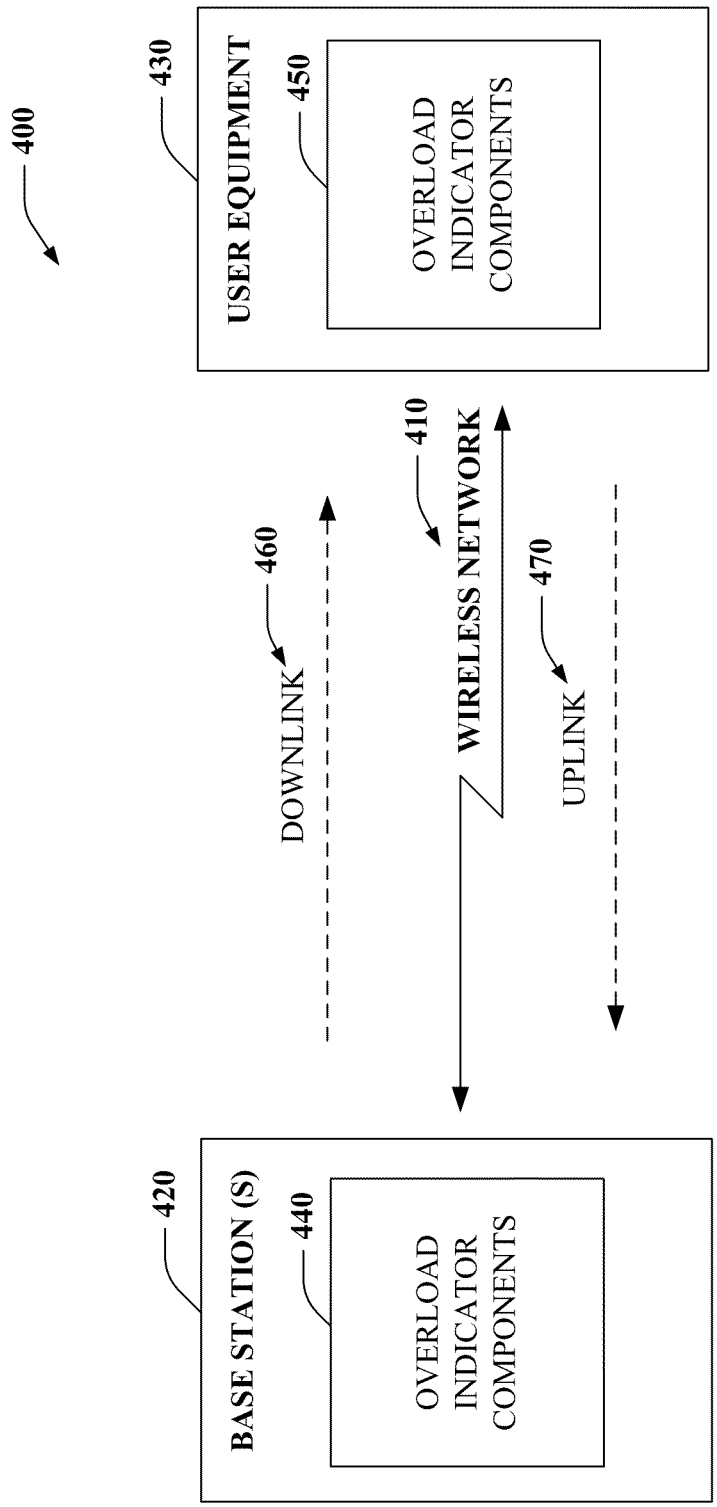
FIG. 4 illustrates the various components within a network associated with the generation and processing of an overload indicator.

The various disclosed embodiments provide systems, methods, apparatus and computer program products that enable the transmission of an over-the-air overload indicator to facilitate uplink power control in a wireless communication system. FIG. 4 illustrates a system 400 that employs overload indicator components 440 in a wireless network 410 in accordance with an example embodiment. The system 400 comprises one or more base stations 420 (also referred to as a node, evolved node B—eNB, serving eNB, target eNB, femto station, pico station, relay base station, and the like) which can be an entity capable of communication over the wireless network 410 to one or more devices 430. For instance, each device 430 can be a user equipment (also referred to as terminal, access terminal, mobility management entity (MME), mobile device, and the like). The base station 420 can include overload indicator components 440 that are configured to generate and/or process overload indicators over the wireless network 410. At least a portion of the overload indicator components 440 at the base station 420 may also be configured to generate and/or process the overload indicator that may be received from other networks and/or network devices, such as a backhaul interface connection. The user equipment 430 can include overload indicator components 450 that are configured to process overload indicators over the wireless network 410. It should be noted that although FIG. 4 depicts two components 420 and 430 designated as overload indicator components, more than two components can be employed on the network 410, where such additional components can also be configured to perform the various operations, such as different signal processing operations, described herein. As illustrated in FIG. 4, the base station 420 communicates to the device 430 via downlink 460 and receives data via uplink 470. Such designation as uplink and downlink is arbitrary as the device 430 can also transmit data via downlink and receive data via uplink channels.

In some embodiments, an over-the-air overload indicator may be transmitted by an eNodeB that is experiencing high interference levels and received directly by one or more devices in a wireless communications network. For example, referring to FIG. 4, an overload indicator may be generated by the overload indicator components 440 of the base station 420, and transmitted directly to one or more user equipment 430. The base station 420 may be associated with a cell within the communication network 410, and the one or more devices 430 may be located within one or more neighboring cells. The over-the-air overload indicator that is received by the user equipment 430 may then be processed by the overload indicator components 450 of the device 430 to facilitate power control.

In certain embodiments, the device 430 uses the over-the-air overload indicator received from, for example, a neighboring cell, in addition to other information, such as power control commands received from its serving base station, to determine and implement its transmit power. Additionally, the device 430 may also report the received over-the-air overload indicator information to its serving base station so that the serving base station is aware of the interference that is being experienced by the neighboring cell. By utilizing the above-described method, interference control can be effected between base stations even without an X2 connection. In addition, interference control between base stations from different vendors may also be successfully carried out since the overload indicator is directly received by the device 430, and its response to the overload indicator is fully specified. Moreover, the device 430 can utilize the most up-to-date measurements of its radio frequency (RF) environment while preparing the proper response to the over-the-air overload indicator.

Figure 5:
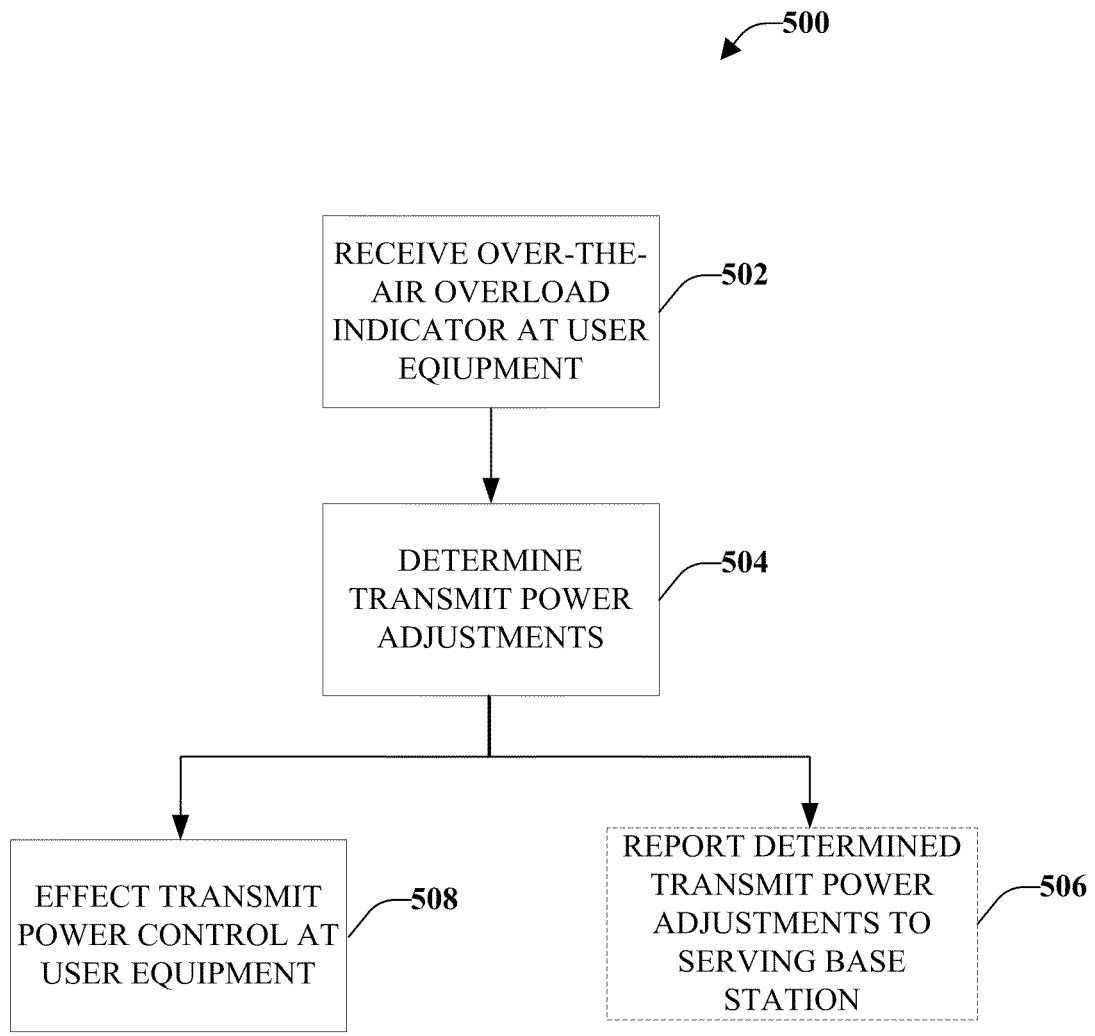
FIG. 5 is a block diagram illustrating a disclosed method for receiving and utilizing an over-the-air overload indicator.

FIG. 5 is a block diagram illustrating an exemplary embodiment. The method 500 starts, at 502, when a user equipment receives one or more over-the-air overload indicators from one or more neighboring cells. In response to receiving the one or more over-the-air overload indicator(s), the user equipment, at 504, determines the adjustments to the transmit power of the user equipment in order to reduce or eliminate the interference. In some embodiment, by the way of example, and not by limitation, such adjustments may include modifying transmit power values, making adjustments to transmission schedule and/or reallocating frequencies for transmissions of the user equipment. At least some of the above-noted adjustments, for example, certain changes to the transmission schedule and/or bandwidth, may be carried out by a base station. Therefore, the user equipment may request the base station to effect such adjustments. At 506, the user equipment may optionally report the above-noted adjustments to its serving base station. Finally, at 508, the user equipment may effect power control based on the adjustments. It should be noted that the blocks and operations discussed above are for exemplary purposes. The disclosed embodiments are not limited to the example blocks and may be implemented with fewer or more blocks and operations. For example, while the exemplary block diagram of FIG. 5 illustrates separate blocks for determining the adjustments and effecting power control, it is entirely possible to combine these operations into one step that is performed, for example, at 504.

Figure 6:
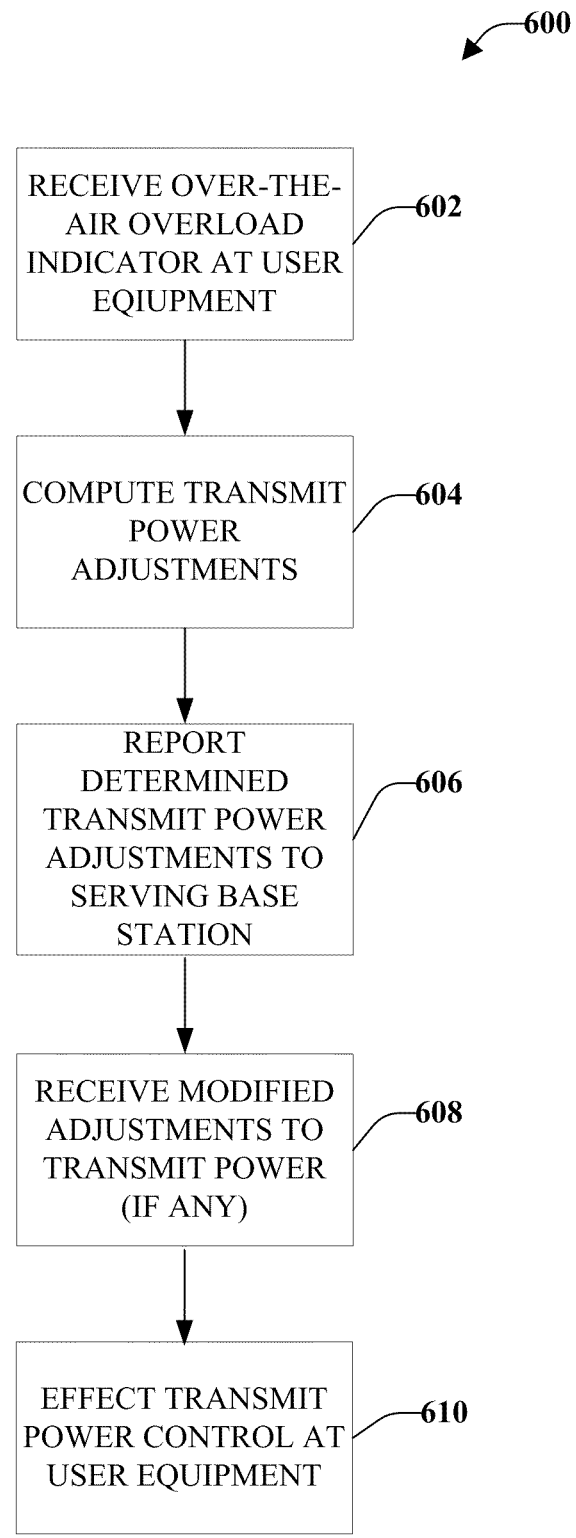
FIG. 6 is a block diagram illustrating another disclosed method for receiving and utilizing an over-the-air overload indicator.

According to another embodiment, the device 430 may first compute the power spectral density at which it should transmit based on the received over-the-air overload indicator. The computed power spectral density may then be transmitted to the serving base station, which is also given the opportunity to modify the computed transmit power densities. For example, the serving base station may need to modify the transmit power in order to allow certain high-priority traffic to pass through within a certain delay budget. It should be noted that according to this embodiment, the overload indicator is communicated to the device 430 as well as its serving base station without using an X2 interface. However, since both the device 430 and its serving base station participate in determining the transmit powers, the power control operation may be affected by the additional latency, as well as the uplink data overhead FIG. 6 is a block diagram illustrating an exemplary embodiment that includes some interactions between the user equipment and its serving base station. The method 600 starts, at 602, when a user equipment receives an over-the-air overload indicator from one or more neighboring cells. In response to receiving the one or more over-the-air overload indicator(s), the user equipment, at 604, computes the adjustments to the transmit power in order to reduce or eliminate the interference. At 606, the user equipment reports the computed transmit power adjustments to its serving base station. At 608, the user equipment may receive modified adjustments to the transmit power from the serving base station. The modified adjustments received from the serving base station may comprise new transmit power adjustments and/or commands that are necessary to effect such adjustments or an indication that no changes to the previously computed transmit power adjustments are necessary. If no modifications to the adjustments that were computed by the user equipment are necessary, the user equipment may, alternatively, simply receive no additional information at 608 within, for example a pre-defined period. Finally, at 610, the user equipment may effect power control based on the updated transmit power adjustments and/or commands.

Figure 7:
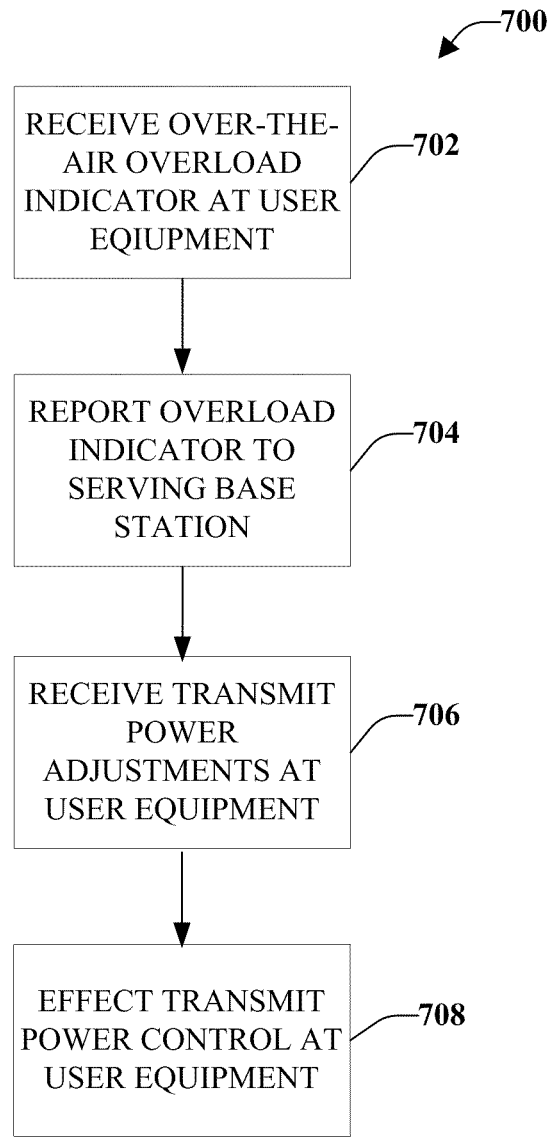
FIG. 7 is a block diagram illustrating another disclosed method for receiving and utilizing an over-the-air overload indicator.

In another embodiment, the device 430 may receive one or more over-the-air overload indicators and subsequently report the received information to its serving base station. The serving base station can then compute the appropriate transmit power adjustments based on the received overload indicators, as well as other information, such as measurement reports sent by one or more user equipment within the wireless network 410. The power control adjustments/commands may then be transmitted from the serving base station to the device 430 to effect transmit power control at the device 430. While, according to this embodiment, the exchange of overload indicator information still can be carried out without the need for an X2 interface, the power control adjustments/commands that are generated by the serving base station may be susceptible to outdated information regarding the RF environment. Additionally, if the base station's response to the received overload indicator is not specified or is not part of a standardized protocol, some base stations may not respond to the overload indicators. Therefore, the ability to control interference in a multi-vendor deployment may be lost FIG. 7 is a block diagram illustrating another exemplary embodiment that relates to power control based on adjustments/commands received from the serving base station. The method 700 starts, at 702, when a user equipment receives one or more over-the-air overload indicators from one or more neighboring cells. In response to receiving the one or more over-the-air overload indicators, the user equipment, at 704, reports the overload indicator information to its serving base station, where appropriate power control adjustments are computed. At 706, the user equipment receives transmit power adjustments from its serving base station. The transmit power adjustments received from the base station may comprise new transmit power adjustments and/or commands that are necessary to effect such adjustments. Finally, at 708, the user equipment effects transmit power control based on the received adjustments.

As evident from the above description, the computations that are carried out in accordance with embodiments illustrated in FIGS. 5 and 6 are primarily executed at the user equipment, while the computations for determining transmit power levels, in accordance with the embodiment described in FIG. 7, are mainly carried out at the base station. Further, in connection with the embodiment that is illustrated in FIG. 7, the exact algorithm for determining power control commands at the base station may not specified.

Figure 8:
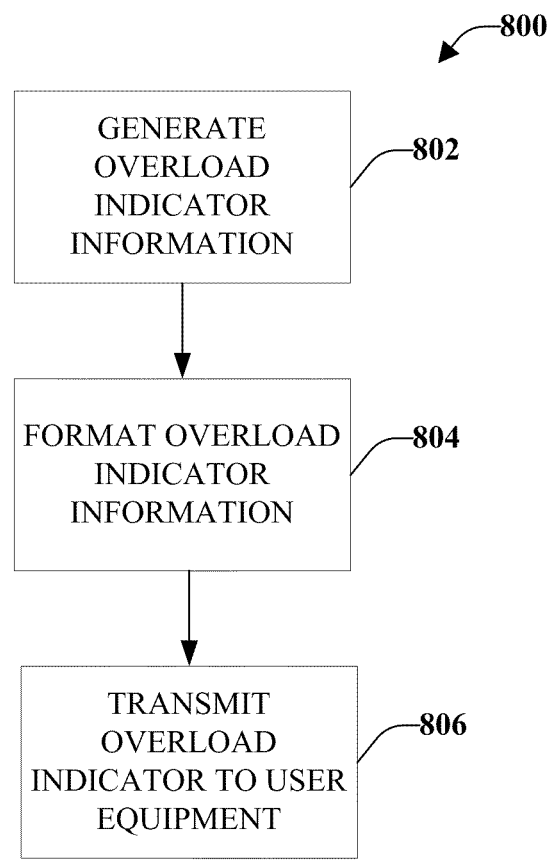
FIG. 8 is a block diagram illustrating a disclosed method for generating an over-the-air overload indicator.

FIG. 8 is a block diagram illustrating the operations that may be carried out for generating the over-the-air overload indicator in accordance with another embodiment. The method 800 starts, at 802, with the generation of the overload indicator information at a cell experiencing excess levels of interference. The contents of the overload indicator information may be identical to those of the existing overload indicators that are generated for transmission to other base stations over the backhaul (e.g., an X2 interface). Alternatively, the contents of the over-the-air overload indicator may include a subset, and/or a compressed version, of the information contained within the conventional overload indicators. In yet another alternative, the contents of the over-the-air overload indicator may include information additional to the information contained within the conventional overload indicators. In one example, the contents of the overload indicator is a binary value that indicates either the presence or the absence of overload/interference conditions. In addition, the overload indicators may provide information related to overload conditions associated with a specific time and/or frequency resources.

Referring back to FIG. 8, at 804, the overload indicator information is formatted. By the way of example, and not by limitation, in some embodiments, the formatting operations may include source coding, channel coding, modulation coding, error correction coding, interleaving, encryption and/or other data formatting and conditioning operations that are necessary to prepare the overload indicator information for transmission. At 806, the overload indicator is transmitted to one or more user equipment. The one or more user equipment may be located within one or more neighboring cells.

Upon the reception of an over-the-air overload indicator, a user equipment may respond by initiating a power control operation. One method for effecting transmit power control may be based on transmit power adjustments computed with an algorithm that is similar to the "OR of downs" algorithm. According to the "OR of downs" algorithm, a user equipment may decrease its transmit power if it receives a DOWN request from any one of a plurality of base stations. However, the user equipment will only increase its transmit power if it receives an UP requests from all base stations. Similarly, in some provided embodiments, a user equipment may reduce its transmit power by a fixed step size, $\Delta_{down}$, if it receives an over-the-air overload indicator from any neighboring cell. Further, the user equipment may increase its transmit power level by a fixed step size, $\Delta_{up}$, only if it fails to receives any overload indicators within a specified period of time. The above-noted power control algorithms may be implemented, for example, at the media access control (MAC) layer.

In order to provide meaningful bounds on the maximum and minimum transmit power levels, two signal-to-noise ratios, $SNR_{max}$ and $SNR_{min}$ may be established for the SNR achieved at the serving base station. The upper limit, $SNR_{max}$, ensures that the user equipment does not transmit at a power level that is greater than that required to achieve the peak spectral efficiency. Similarly, the lower limit, $SNR_{min}$, ensures that each user equipment is able to achieve a certain minimum SNR. Such an algorithm allows the network to control the IoT observed at each base station. However, since all user equipment in the network react to the overload indicator in a similar manner, no power shaping gains may be achieved through this algorithm.

In order to achieve power-shaping gains, the response of a user equipment can be based on the amount of interference that is being caused by the user equipment. As such, in some embodiments, differential path-loss, $\Delta_{PL}$, which is a proxy for the interference caused by a user equipment, can be employed for providing power-shaping gains. Path-loss generally refers to the loss in signal strength due to propagation. Differential path-loss, $\Delta_{PL}$, for a given configuration of base stations and user equipment may be determined as: $PL_{eNB}-PL_{eNB,serv}$. Here, $PL_{eNB}$ denotes the path-loss in dB scale between the user equipment and the base station that is experiencing excess interference levels, and $PL_{eNB,serv}$ denotes the path-loss in dB scale between the user equipment and its serving base station. In some embodiments, the differential path-loss, $\Delta_{PL}$, may be used in conjunction with a probability to determine the appropriate transmit power adjustments and subsequently effect transmit power control at one or more user equipment within a wireless network.

In one example, a user equipment, upon receiving an overload indicator, may reduce its transmit power level by a fixed step size, $\Delta_{down}$, in accordance with probability $p_{down}(\Delta_{PL}, SNR)$. In this example, the probability, $p_{down}$, is a function of both the SNR obtained at the serving base station and the differential path-loss, $\Delta_{PL}$. Generally, no action may be carried out with a probability $1-p_{down}$. Analogously, when no overload indicators are received, a user equipment may increase its transmit power level by a fixed step size, $\Delta_{up}$, with probability $p_{up}(\Delta_{PL}, SNR)$. In this example, the probability, $p_{up}$, is also a function of both the SNR obtained at the serving base station and the differential path-loss, $\Delta_{PL}$. When no overload indicators are received, and there is only one neighboring base station, the differential path-loss, $\Delta_{PL}$, may be calculated with respect to that neighboring base station. If multiple neighboring base stations are present, the above-noted probability value may be a function of multiple differential path-loss, $\Delta_{PL}$, values that are determined for multiple neighboring cells. It should be noted that the path-loss to neighboring base stations can be measured even if no overload indicators are received. In some example embodiments, the probability function $p_{up}(\Delta_{PL}, SNR)$ may be chosen such that it is low when the differential path-loss, $\Delta_{PL}$, is low and/or when SNR is high, while the probability function $p_{down}(\Delta_{PL}, SNR)$ may be chosen such that it behaves in the opposite manner. These properties are satisfied, for example, by the following functions:

$$p_{up}(\Delta_{PL}, SNR) = a(1-b);$$

$$p_{down}(\Delta_{PL}, SNR) = (1-a)b;$$

$$a = (\Delta_{PL}-\Delta_{PL,min})/(\Delta_{PL,max}-\Delta_{PL,min});$$

$$b = (SNR-SNR_{min})/(SNR_{max}-SNR_{min}).$$

In the above example, the calculations are carried out in dB scale, and $\Delta_{PL,min}$ and $\Delta_{PL,max}$ refer to the upper and lower limits defined for the differential path-loss, $\Delta_{PL}$, which, for example, may be fixed, pre-determined values. The above-described probabilistic response of a user equipment to an overload indicator is also advantageous in that it reduces and/or eliminates potential oscillatory behavior in a network. Such oscillatory behavior may be produced when a large number of user equipment simultaneously increase or decrease their transmit powers.

In one variation of the above described embodiments, when multiple overload indicators from multiple cells are received, the user equipment's response may include determining the associated power adjustments, and/or probability, $p_{down}$, values, for each of the received overload indicators, and selecting a particular power adjustment value, and/or a particular $p_{down}$ value, for decreasing the user equipment's transmit power. For example, the largest power adjustment value may be selected. In another variation, when no overload indicators are received within a specified period of time, one or more power adjustment values, and/or probability, $p_{up}$, values, may be determined, and a power adjustment value and/or a particular $p_{up}$ value, may be selected for increasing the user equipment's transmit power. In one example, the power adjustment value corresponding to the closest non-serving base station may be selected.

According to the disclosed embodiments, the over-the-air overload indicator is transmitted in such a manner as to enable its reception and demodulation by a plurality of user equipment in a plurality of neighboring cells. As such, the over-the-air overload indicator must be decodable at low SNRs. In one exemplary embodiment, the penetration of the over-the-air overload indicator is at least similar to that of the primary synchronization code (PSC) and secondary synchronization code (SSC). Performance requirements for the PSC and SSC channels state that the user equipment should be able to acquire an base station with an SNR of −6 dB within a limited acquisition time. The provision of the over-the-air overload indicator at penetration levels that are similar to the PSC and SSC ensures proper reception and demodulation of the overload indicators by the different user equipment. However, such an over-the-air overload indicator may also be detectable at even lower SNR values since the user equipment may be allowed to spend more time to acquire this signal. Further, while the overload indicator is often received at very low SNRs, it can probably tolerate a larger erasure rate as compared to other control channels.

The various disclosed embodiments also enable the demodulation of the over-the-air overload indicator with imposing minimal additional computational complexity on the user equipment. In one particular embodiment, the over-the-air overload indicator may be transmitted on the central six resource blocks of the base station downlink transmission bandwidth in an LTE network. A user equipment normally monitors this bandwidth from the neighboring cells for detection of new base stations, as well as for tracking of base stations that have already been detected. As a result, demodulating the additional overload indicator value or values that are transmitted on the same bandwidth imposes relatively few changes to the user equipment implementation.

The various disclosed embodiments also enable demodulation of the over-the-air overload indicator with minimal impact on battery life of a user equipment. In LTE systems, a user equipment may be placed in discontinuous reception (DRX) mode to preserve the battery life of the user equipment. While at least portions of a user equipment that is operating in the DRX mode may be powered down for extended periods of time, the user equipment occasionally monitors the downlink and/or uplink. Further, the user equipment may scan neighboring base stations if the signal quality from the serving base station is degraded. In some embodiments, the over-the-air overload indicator may be transmitted such that it can be detected while a user equipment is performing neighborhood tracking. For example, the over-the-air overload indicator may be transmitted on subframe 0 or subframe 5 of an LTE frame since these subframes are already monitored by the user equipment for neighborhood tracking purposes. In one example, subframe 5 is used for transmitting the over-the-air overload indicator. Compared to subframe 0, subframe 5 has more resources available for accommodating the overload indicator since subframe 0 already contains the physical broadcast channel (PBCH).

Additionally, if the over-the-air overload indicator transmission period is set to a value larger than or equal to, for example, 20 ms, the transmission of system information block 1 (SIB1) on the subframe may be avoided. SIB1 is transmitted on subframe 5 every 20 ms (i.e., on alternate "Subframe 5"). Therefore, if the overload indicator period is selected to be 20 ms or more, it can be transmitted on a subframe 5 that is not used for SIB1 transmission. SIB1 typically contains cell access related information, such as public land mobile network (PLMN), cell identity and the like, as well as information for cell selection, scheduling information and other system information.

Further, a user equipment in DRX mode can be allowed to monitor a subset of over-the-air overload indicator transmissions to further preserve its battery life. For example, to achieve the same reporting rate as the LTE overload indicator transmitted over the backhaul, a user equipment can monitor one over-the-air overload indicator every 20 ms. It should be noted that monitoring periods other than 20 ms may also be selected. Additionally, or alternatively, if the network configuration does not allow a user equipment to operate in the DRX mode while transmitting data on the uplink, the user equipment may ignore overload indicator transmissions during the uplink transmissions. In such a scenario, the serving base station may assign a conservative initial power value (e.g., based on open loop projections) for uplink transmissions that occur after a long DRX cycle.

In accordance with another embodiment, the over-the-air overload indicator may be transmitted in more than one resource blocks among the six central resource blocks of a subframe. For example, two resource blocks may be used for transmitting the over-the-air overload indicator. In addition, the overload indicator may be channel coded into, for example, a pseudo random sequence prior to its transmission.

According to another example embodiment, the SSC may be used as a phase reference for demodulating the over-the-air overload indicator. For example, one bit overload indicator can be sent using BPSK modulation and the beam used for SSC, that is the over-the-air overload indicator may use the same phase, or a different phase, and the same beam direction (in the case of multiple transmit antennas), as the SSC. When using the SSC, as opposed to using the common reference symbols (RS), as a phase reference, the user equipment is only required to obtain a single channel estimate even if the cell has more than one transmitting antenna. Also, the density of SSC in the center six resource blocks is more than that of the common RS. As a result, channel estimation losses are minimized. In an alternate embodiment, the over-the-air overload indicator may be transmitted as a phase between a combination of RS signals and the SSC. It should also be noted that the user equipment may employ a simplified detection algorithm. For example, a time or frequency correlation between the SSC and the dedicated RS symbols with the overload indicator symbols may be used, optionally after suitable filtering. To reduce hardware complexity, the user equipment may use the components that are already implemented as part of the LTE searcher and/or the measurement report engine, such as time alignment with new sectors, searcher detection, FFT engine and the like.

Figure 9:
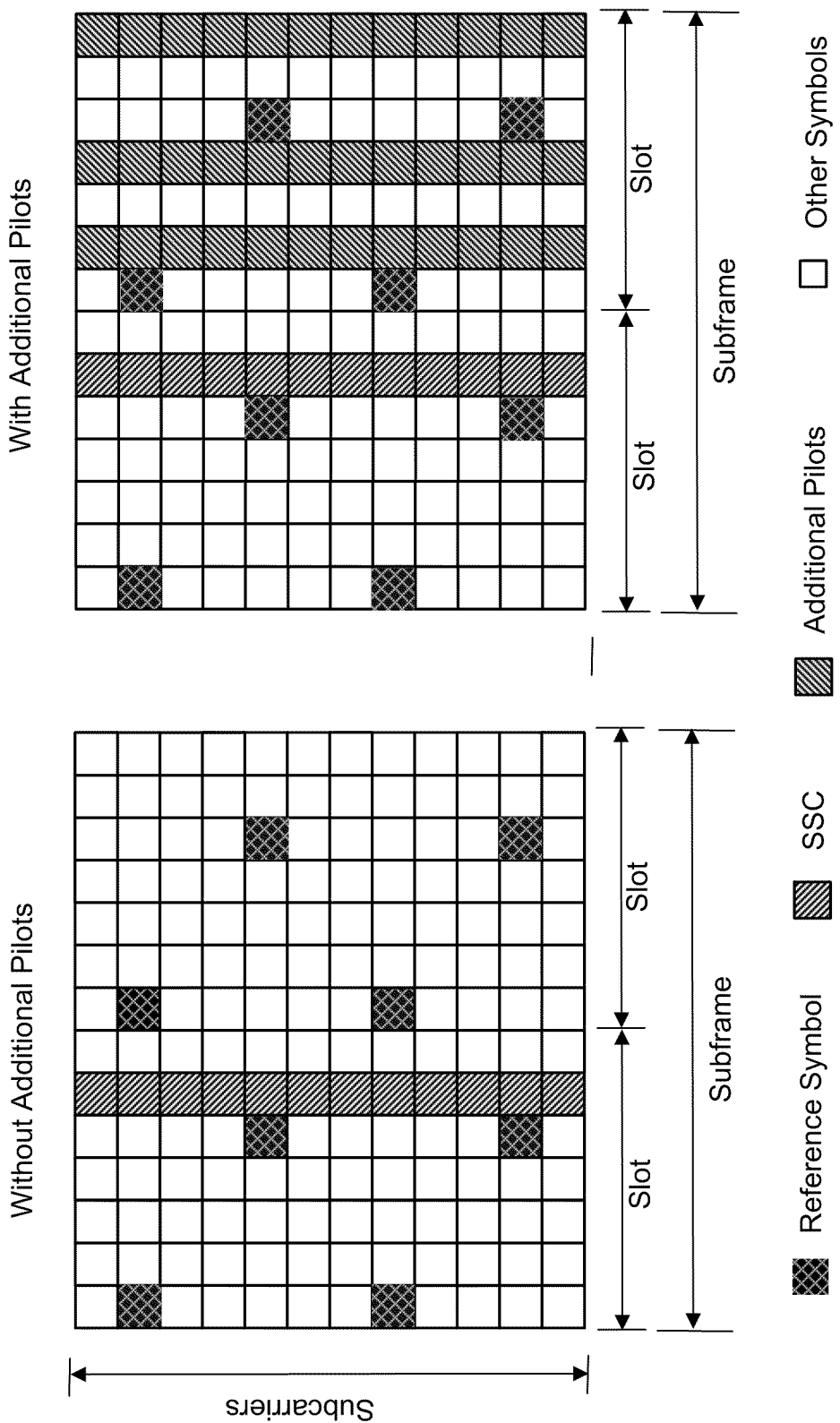
FIG. 9 illustrates the locations of various symbols within a subframe when normal cyclic prefix codes is used.
Figure 10:
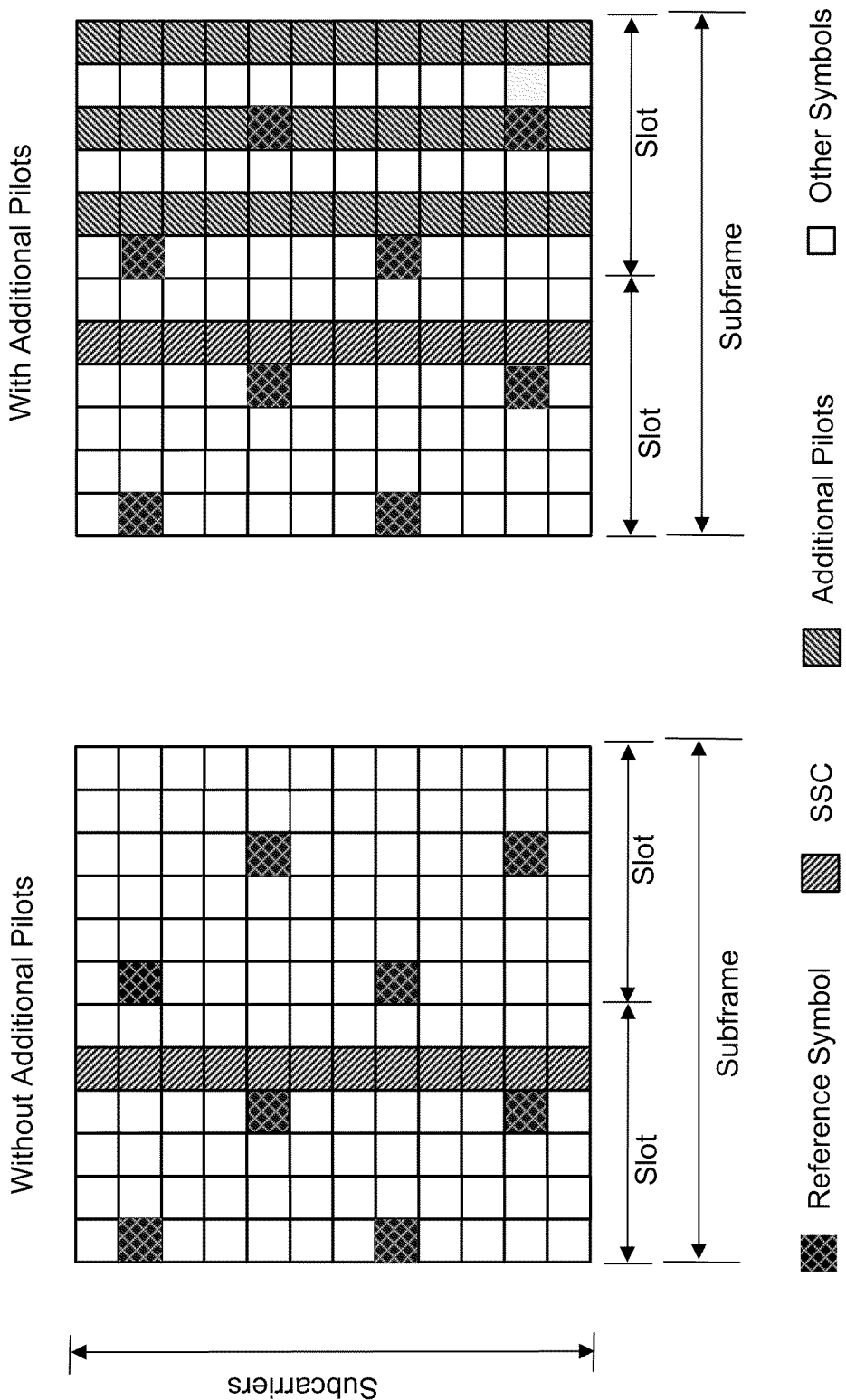
FIG. 10 illustrates the locations of various symbols within a subframe when extended cyclic prefix codes is used.

Additionally, in order to improve channel estimation performance, additional pilot symbols may be inserted into the resource blocks that are used for transmission of the over-the-air overload indicators. FIG. 9 illustrates the insertion of the additional pilot symbols in an exemplary single-antenna LTE subframe with normal cyclic prefix code. The subframe on the left-hand side of FIG. 9 illustrates the scenario in which SSC is used as a pilot signal with no additional insertions of pilot symbols. The subframe on the right-hand side of FIG. 9 illustrates the locations of additional pilot symbols that have been inserted in accordance with an example embodiment. FIG. 10 illustrates another example embodiment, which is similar to FIG. 9, except for the use of extended cyclic prefix coding, as evident from the reduced number of symbols (i.e., six symbols instead of seven) in each slot.

Figure 11:
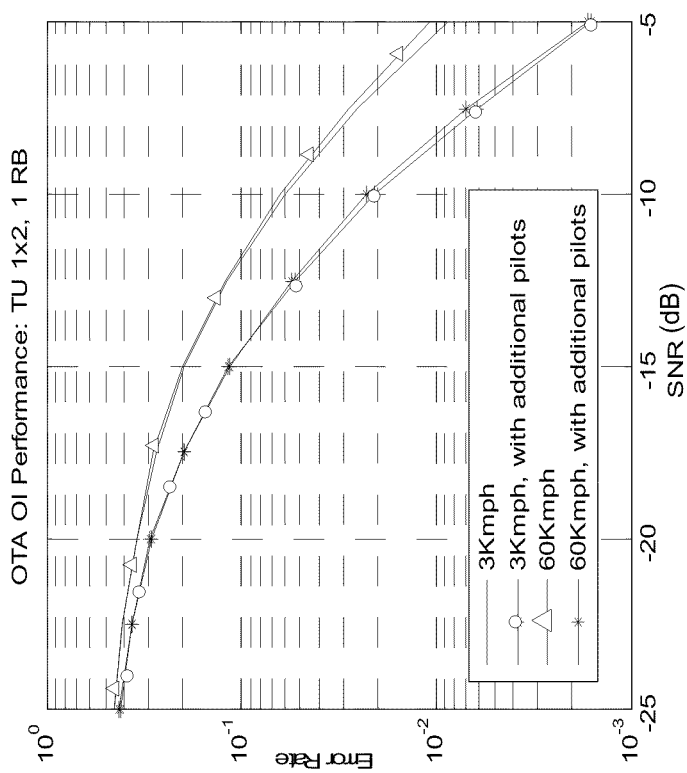
FIG. 11 illustrates exemplary error rate versus signal-to-noise ratio plots for an over-the-air overload indicator transmitted using one resource block.
Figure 12:
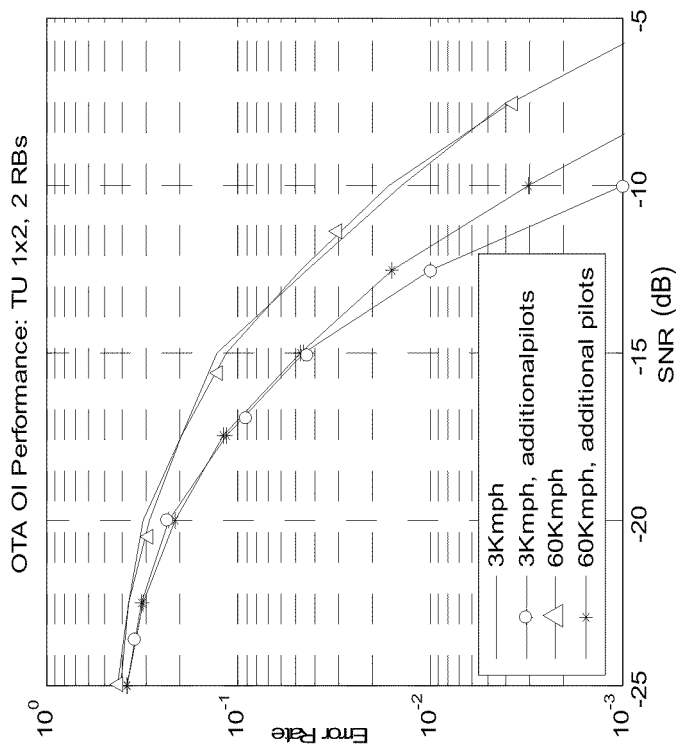
FIG. 12 illustrates exemplary error rate versus signal-to-noise ratio plots for an over-the-air overload indicator transmitted using two resource blocks.

FIG. 11 illustrates example performance plots (i.e., error rate versus SNR) associated with over-the-air overload indicators that are transmitted using a single resource block with and without additional pilot symbols. FIG. 11 also illustrates the differences in performance based on the speed of a moving user equipment at 3 Km per hour and 60 Km per hour, respectively. As evident from FIG. 11, an error rate of about 6% may be achieved at an SNR of −10 dB, even when a single resource block is used for the transmission of the over-the-air overload indicator. This error rate improves to about 2% at −10 dB SNR when additional pilot symbols are utilized. FIG. 12 illustrates similar performance plots for the scenario in which two resource blocks are used for the transmission of the over-the-air overload indicator. FIG. 12 illustrates further improvements in the error rates due to the use of additional resource blocks.

In certain embodiments, if a user equipment that monitors a plurality of over-the-air indicators from multiple cells with similar, but possibly asynchronous, timings, the user equipment may choose to subsample the overload indicators that are received from different cells. The user equipment can then apply additional step-sizes (i.e., transmit power adjustments, $\Delta_{down}$ and $\Delta_{up}$) to respond to the subsampled overload indicators. For example, if the user equipment is monitoring the overload indicators at half the normal rate, the transmit power adjustments may be doubled in size. Additionally, or alternatively, the cells may select to transmit the over-the-air overload indicators at subframes whose positions within the radio frame varies from time to time, thus preventing repeated overload indicator collisions at the user equipment.

In a multicarrier system, an overload indicator on a given downlink carrier may correspond to one carrier or multiple carriers. Also, multiple overload indicators covering different carriers may be transmitted on the same downlink carrier. According to an embodiment, when multiple overload indicators are transmitted on one downlink carrier, different resource blocks may be used to transmit the overload indicators associated with different carriers. In another example embodiment, an overload indicator may also be used to control interference caused by Adjacent Carrier Leakage Ratio (ACLR). ACLR is often associated with a scenario in which a user equipment transmitting on carrier 1 causes interference with carrier 2 transmissions. According to another exemplary embodiment, the same or a different overload indicators may be used to control the co-channel interference and the ACLR.

The use of the over-the-air overload indicator, in accordance with the various disclosed embodiments, improves the interference-over-thermal (IoT) cumulative density function (CDF) and allows a tight control over the IoT levels seen at each base station. This improvement is particularly evident for smaller cells. Tight control of the IoT levels ensures that an appropriate link budget can be maintained for data channels, as well as for control channels that are transmitted on, for example, the physical uplink shared channel (PUSCH) (e.g., when PUCCH and PUSCH are transmitted in the same subframe). Additionally, control of the IoT improves SNR predictability in a subframe, which leads to more accurate predictions of data rates, and more importantly, ensures reliable control reception in cases where control channels are transmitted on PUSCH resources.

In addition, the use of the over-the-air indicator, in accordance with the various disclosed embodiments, significantly improves the performance of the user equipment at the cell edge when power shaping is effected. If no power shaping is used, the improvement in fairness from using the overload indicator may be accompanied by a loss in total cell throughput. Use of power shaping, in accordance with the disclosed embodiments, improves the total cell throughput while maintaining the improvement in edge user equipment performance. In particular, the use of power shaping, in accordance with the disclosed embodiments, allows the maintenance of a cell throughput that is almost on par with the cell throughput in the absence of any overload indicators.

Figure 13:
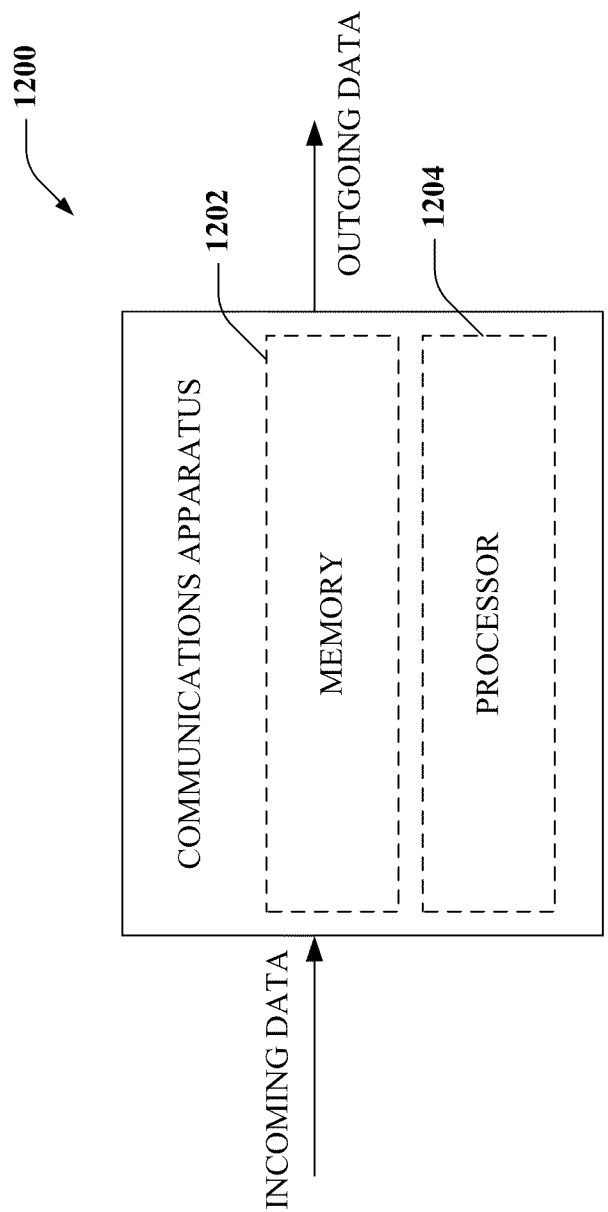
FIG. 13 illustrates an apparatus within which the various disclosed embodiments may be implemented.

FIG. 13 illustrates an apparatus 1300 within which the various disclosed embodiments may be implemented. In particular, the apparatus 1300 that is shown in FIG. 13 may comprise at least a portion of a base station or at least a portion of a user equipment (such as the base station 420 and the base station 430 that are depicted in FIG. 4) and/or at least a portion of a transmitter system or a receiver system (such as the transmitter system 210 and the receiver system 250 that are depicted in FIG. 2). The apparatus 1300 that is depicted in FIG. 13 can be resident within a wireless network and receive incoming data via, for example, one or more receivers and/or the appropriate reception and decoding circuitry (e.g., antennas, transceivers, demodulators and the like). The apparatus 1300 that is depicted in FIG. 13 can also transmit outgoing data via, for example, one or more transmitters and/or the appropriate encoding and transmission circuitry (e.g., antennas, transceivers, demodulators and the like). Additionally, or alternatively, the apparatus 1300 that is depicted in FIG. 13 may be resident within a wired network.

FIG. 13 further illustrates that the apparatus 1300 can include a memory 1302 that can retain instructions for performing one or more operations, such as signal conditioning, analysis, and the like. Additionally, the apparatus 1300 of FIG. 13 may include a processor 1304 that can execute instructions that are stored in the memory 1302 and/or instructions that are received from another device. The instructions can relate to, for example, configuring or operating the apparatus 1300 or a related communications apparatus. It should be noted that while the memory 1302 that is depicted in FIG. 13 is shown as a single block, it may comprise two or more separate memories that constitute separate physical and/or logical units. In addition, the memory while being communicatively connected to the processor 1304, may reside fully or partially outside of the apparatus 1300 that is depicted in FIG. 13. It is also to be understood that one or more of components, such as the overload indicator components 440 and 450 that are shown in FIG. 4, can exist within the memory 1302.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

It should also be noted that the system 1300 of FIG. 13 can be employed with an user equipment or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD), and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a user equipment (e.g. 308 FIG. 3, 508 FIG. 8, 702 FIG. 7) in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 308 FIG. 3, 508 FIG. 8, 702 FIG. 7). In the alternative, the processor and the storage medium may reside as discrete components in a user equipment (e.g. 308 FIG. 3, 508 FIG. 8, 702 FIG. 7). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

In one configuration, the apparatus for wireless communication includes means for determining adjustments to transmit power of a user equipment in response to a received over-the-air overload indicator, the over-the-air overload indicator comprising information indicative of interference conditions at one or more cells and means for effecting transmit power control in accordance with the adjustments. In one aspect, the aforementioned means may be the processor(s) configured to perform the functions recited by the aforementioned means. In another aspect, the aforementioned means may be a module or any apparatus configured to perform the functions recited by the aforementioned means.

In one configuration, the apparatus for wireless communication includes means for reporting an over-the-air overload indicator to a serving base station of the apparatus, where the over-the-air overload indicator comprises information indicative of interference conditions at one or more cells. The apparatus further comprises means for receiving adjustments to transmit power of the user equipment, and means for effecting transmit power control in accordance with the adjustments. In one aspect, the aforementioned means may be the processor(s) configured to perform the functions recited by the aforementioned means. In another aspect, the aforementioned means may be a module or any apparatus configured to perform the functions recited by the aforementioned means.

In one configuration, the apparatus for wireless communication includes means for generating one or more over-the-air overload indicators at a base station, where the one or more over-the-air overload indicators comprise information indicative of interference conditions at a cell. The apparatus further comprises means for transmitting the one or more overload indicators directly to one or more user equipment in one or more neighboring cells. In one aspect, the aforementioned means may be the processor(s) configured to perform the functions recited by the aforementioned means. In another aspect, the aforementioned means may be a module or any apparatus configured to perform the functions recited by the aforementioned means.

What is claimed is:

1. A method, comprising:
    determining first adjustments to a transmit power of a user equipment in response to an over-the-air overload indicator received at the user equipment, the over-the-air overload indicator comprising information indicative of interference conditions at one or more cells;
    effecting transmit power control in accordance with the first adjustments;
    determining second adjustments to the transmit power of the user equipment in accordance with a probability function when no over-the-air overload indicators are received at the user equipment within a specified period; and
    effecting transmit power control in accordance with the second adjustments.

2. The method of claim 1, wherein the first and second adjustments further comprise at least one of a power level adjustment, a transmit schedule adjustment, or a transmit frequency adjustment.

3. The method of claim 1, further comprising reporting the first adjustments, the second adjustments, or both to a serving base station of the user equipment.

4. The method of claim 1, wherein the over-the-air overload indicator is received as part of one or more resource blocks within a subframe.

5. The method of claim 1, wherein the transmit power control is effected in accordance with the adjustments that provide transmit power shaping.

6. The method of claim 1, wherein the adjustments are determined in accordance with at least one of a differential path loss and a signal to noise ratio.

7. The method of claim 1, wherein more than one over-the-air overload indicators are received at the user equipment, and the adjustments are determined by:
    determining separate adjustments to transmit power of the user equipment in response to each of the more than one over-the-air overload indicators; and
    determining the first adjustments in accordance with the separate adjustments.

8. The method of claim 7, wherein the first adjustments correspond to one or more of the separate adjustments with the largest value.

9. The method of claim 1, wherein the over-the-air overload indicator comprises information related to multiple carriers.

10. The method of claim 9, wherein
the overload indicator is received on a single downlink carrier; and
information related to each of the multiple carriers is carried in a separate resource block within the downlink carrier.

11. The method of claim 1, wherein the over-the-air overload indicator comprises information indicative of co-channel interference conditions.

12. A method, comprising:
determining first adjustments to a transmit power of a user equipment in response to a plurality of over-the-air overload indicators received at the user equipment, wherein the plurality of over-the-air overload indicators are received at the user equipment from a plurality of neighboring cells, each of the over-the-air overload indicators comprising information indicative of interference conditions at one or more cells;
effecting transmit power control in accordance with the first adjustments;
determining second adjustments to the transmit power of the user equipment by assessing a fraction of the received over-the-air overload indicators when no further over-the-air overload indicators are received at the user equipment within a specified period; and
effecting transmit power control in accordance with the second adjustments.

13. The method of claim 12, wherein the magnitude of the adjustments is modified by a factor that is inversely proportional to the fraction.

14. A method, comprising:
determining first adjustments to a transmit power of a user equipment in response to an over-the-air overload indicator received at the user equipment, the over-the-air overload indicator comprising information indicative of interference conditions at one or more cells;
effecting transmit power control in accordance with the first adjustments;
determining whether any further over-the-air overload indicators are received by the user equipment;
determining second adjustments to the transmit power of the user equipment that correspond to an increase in transmit power level of the user equipment when no further over-the-air overload indicators are received at the user equipment within a specified period; and
effecting transmit power control in accordance with the second adjustments.

15. The method of claim 14, wherein the transmit power level of the user equipment is increased when the transmit power level does not exceed a predetermined threshold.

16. A method, comprising:
determining first adjustments to transmit power of a user equipment in response to an over-the-air overload indicator received at the user equipment, the over-the-air overload indicator comprising information indicative of interference conditions at one or more cells;
reporting the first adjustments to a serving base station;
receiving second adjustments to the transmit power of the user equipment, wherein the received second adjustments are modified first adjustments; and
effecting transmit power control in accordance with the second adjustments.

17. An apparatus, comprising:
a processor; and
a memory comprising processor executable code, the processor executable code, when executed by the processor, configures the apparatus to:
determine first adjustments to a transmit power of the apparatus in response to an over-the-air overload indicator received at the apparatus, the over-the-air overload indicator comprising information indicative of interference conditions at one or more cells;
effect transmit power control in accordance with the first adjustments;
determine second adjustments to the transmit power of the apparatus in accordance with a probability function when no over-the-air overload indicators are received at the apparatus within a specified period; and
effect transmit power control in accordance with the second adjustments.

18. The apparatus of claim 17, wherein the first and second adjustments further comprise at least one of a power level adjustment, a transmit schedule adjustment, or a transmit frequency adjustment.

19. The apparatus of claim 17, wherein the processor executable code, when executed by the processor, configures the apparatus to further report the first adjustments, the second adjustments, or both to a serving base station.

20. The apparatus of claim 17, wherein the processor executable code, when executed by the processor, configures the apparatus to receive the over-the-air overload indicator as part of one or more resource blocks within a third generation partnership project long term evolution subframe.

21. The apparatus of claim 17, wherein the processor executable code, when executed by the processor, configures the apparatus to effect transmit power control in accordance with the adjustments that provide transmit power shaping.

22. The apparatus of claim 17, wherein the processor executable code, when executed by the processor, configures the apparatus to determine the adjustments in accordance with at least one of a differential path loss and a signal to noise ratio.

23. The apparatus of claim 17, wherein, in the presence of more than one over-the-air overload indicators, the processor executable code, when executed by the processor, configures the apparatus to determine the adjustments by:
determining separate adjustments to transmit power of the apparatus in response to each of the more than one over-the-air overload indicators; and
determining the first adjustments in accordance with the separate adjustments.

24. The apparatus of claim 23, the first adjustments correspond to one or more of the separate adjustments with the largest value.

25. The apparatus of claim 17, wherein the over-the-air overload indicator comprises information related to multiple carriers.

26. The apparatus of claim 25, wherein the processor executable code, when executed by the processor, configures the apparatus to receive the overload indicator on a single downlink carrier, wherein information related to each of the multiple carriers is carried in a separate resource block within the downlink carrier.

27. The apparatus of claim 17, wherein the over-the-air overload indicator comprises information indicative of co-channel interference conditions.

28. An apparatus, comprising:
a processor; and
a memory comprising processor executable code, the processor executable code, when executed by the processor, configures the apparatus to:
determine first adjustments to a transmit power of the apparatus in response to a plurality of over-the-air overload indicators received by the apparatus, wherein the plurality of over-the-air overload indicators are received at the apparatus from a plurality of neighboring cells, each of the over-the-air overload indicators comprising information indicative of interference conditions at one or more cells;
effect transmit power control in accordance with the first adjustments;
determine second adjustments to the transmit power of the apparatus by assessing a fraction of the received over-the-air overload indicators when no further over-the-air overload indicators are received by the apparatus within a specified period; and
effect transmit power control in accordance with the second adjustments.

29. The apparatus of claim 28, wherein the processor executable code, when executed by the processor, configures the apparatus to modify the magnitude of the adjustments by a factor that is inversely proportional to the fraction.

30. An apparatus, comprising:
a processor; and
a memory comprising processor executable code, the processor executable code, when executed by the processor, configures the apparatus to:
determine first adjustments to a transmit power of the apparatus in response to an over-the-air overload indicator received by the apparatus, the over-the-air overload indicator comprising information indicative of interference conditions at one or more cells;
effect transmit power control in accordeance with the first adjustments;
determine whether any further over-the-air overload indicators are received by the apparatus;
determine second adjustments to the transmit power of the apparatus that correspond to an increase in transmit power level of the apparatus when no further over-the-air overload indicators are received at the apparatus within a specified period; and
effect transmit power control in accordance with the second adjustments.

31. The apparatus of claim 30, wherein the processor executable code, when executed by the processor, configures the apparatus to increase transmit power of the apparatus by a particular value if the transmit power does not exceed a predetermined threshold.

32. An apparatus, comprising:
a processor; and
a memory comprising processor executable code, the processor executable code, when executed by the processor, configures the apparatus to:
determine first adjustments to transmit power of the apparatus in response to an over-the-air overload indicator received by the apparatus, the over-the-air overload indicator comprising information indicative of interference conditions at one or more cells;
report the first adjustments to a serving base station;
receive second adjustments to the transmit power of the apparatus, wherein the received second adjustments are modified first adjustments; and
effect transmit power control in accordance with the second adjustments.

33. A computer program product, embodied on a computer-readable medium, comprising:
program code for determining first adjustments to a transmit power of a user equipment in response to an over-the-air overload indicator received at the user equipment, the over-the-air overload indicator comprising information indicative of interference conditions at one or more cells;
program code for effecting transmit power control in accordance with the first adjustments;
program code for determining second adjustments to the transmit power of the user equipment in accordance with a probability function when no over-the-air overload indicators are received at the user equipment within a specified period; and
program code for effecting transmit power control in accordance with the second adjustments.

34. A computer program product, embodied on a computer-readable medium, comprising:
program code for determining first adjustments to transmit power of a user equipment in response to an over-the-air overload indicator received at the user equipment, the over-the-air overload indicator comprising information indicative of interference conditions at one or more cells;
program code for reporting the first adjustments to a serving base station of the user equipment;
program code for receiving second adjustments to the transmit power of the user equipment, wherein the received second adjustments are modified first adjustments; and
program code for effecting transmit power control in accordance with the second adjustments.

35. An apparatus, comprising:
means for determining first adjustments to a transmit power of a user equipment in response to an over-the-air overload indicator received at the user equipment, the over-the-air overload indicator comprising information indicative of interference conditions at one or more cells;
means for effecting transmit power control in accordance with the first adjustments;
means for determining second adjustments to the transmit power of the user equipment in accordance with a probability function when no over-the-air overload indicators are received at the user equipment within a specified period; and
means for effecting transmit power control in accordance with the second adjustments.

36. An apparatus, comprising:
means for determining first adjustments to transmit power of a user equipment in response to an over-the-air overload indicator received at the user equipment, the over-the-air overload indicator comprising information indicative of interference conditions at one or more cells;
means for reporting the first adjustments to a serving base station;
means for receiving second adjustments to the transmit power of the user equipment, wherein the received second adjustments are modified first adjustments; and
means for effecting transmit power control in accordance with the second adjustments.

37. A computer program product, embodied on a computer-readable medium, comprising:

program code for determining first adjustments to a transmit power of a user equipment in response to a plurality of over-the-air overload indicators received at the user equipment, wherein the plurality of over-the-air overload indicators are received at the user equipment from a plurality of neighboring cells, each of the over-the-air overload indicators comprising information indicative of interference conditions at one or more cells;

program code for effecting transmit power control in accordance with the first adjustments;

program code for determining the second adjustments to the transmit power of the user equipment by assessing a fraction of the received over-the-air overload indicators when no further over-the-air overload indicators are received at the user equipment within a specified period; and program code for effecting transmit power control in accordance with the adjustments.

38. A computer program product, embodied on a computer-readable medium, comprising:

program code for determining first adjustments to a transmit power of a user equipment in response to an over-the-air overload indicator received at the user equipment, the over-the-air overload indicator comprising information indicative of interference conditions at one or more cells; and program code for effecting transmit power control in accordance with the first adjustments;

program code for determining whether any further over-the-air overload indicators are received by the user equipment;

program code for determining second adjustments to the transmit power of the user equipment that correspond to an increase in transmit power level of the user equipment when no further over-the-air overload indicators are received at the user equipment within a specified period; and program code for effecting transmit power control in accordance with the second adjustments.

39. An apparatus, comprising:

means for determining first adjustments to a transmit power of a user equipment in response to a plurality of over-the-air overload indicators received at the user equipment, wherein the plurality of over-the-air overload indicators are received at the user equipment from a plurality of neighboring cells, each of the over-the-air overload indicators comprising information indicative of interference conditions at one or more cells;

means for effecting transmit power control in accordance with the first adjustments;

means for determining the second adjustments to the transmit power of the user equipment by assessing a fraction of the received over-the-air overload indicators when no further over-the-air overload indicators are received at the user equipment within a specified period; and means for effecting transmit power control in accordance with the second adjustments.

40. An apparatus, comprising:

means for determining first adjustments to a transmit power of a user equipment in response to an over-the-air overload indicator received at the user equipment, the over-the-air overload indicator comprising information indicative of interference conditions at one or more cells; and means for effecting transmit power control in accordance with the first adjustments;

means for determining whether any further over-the-air overload indicators are received by the user equipment;

means for determining second adjustments to the transmit power of the user equipment that correspond to an increase in transmit power level of the user equipment when no further over-the-air overload indicators are received at the user equipment within a specified period; and means for effecting transmit power control in accordance with the second adjustments.

* * * * *